(12) United States Patent
Kim et al.

(10) Patent No.: US 7,592,102 B1
(45) Date of Patent: Sep. 22, 2009

(54) ELECTROLYTE FOR LITHIUM ION SECONDARY BATTERY AND LITHIUM ION SECONDARY BATTERY COMPRISING THE SAME

(75) Inventors: Jinsung Kim, Yongin-si (KR); Narae Park, Yongin-si (KR); Jinhyunk Lim, Yongin-si (KR); Suhee Han, Yongin-si (KR); Jinburn Kim, Yongin-si (KR); Jungkang Oh, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/256,781

(22) Filed: Oct. 23, 2008

(30) Foreign Application Priority Data

May 21, 2008 (KR) .................. 10-2008-0047027

(51) Int. Cl.
*H01M 6/16* (2006.01)
*H01G 9/02* (2006.01)

(52) U.S. Cl. ............... 429/338; 429/341; 429/342; 429/343; 429/199; 429/329; 429/330; 429/332; 429/333; 429/231.95; 429/188; 429/189; 252/62.2

(58) Field of Classification Search ........... 429/338, 429/341, 342, 343, 199, 329, 330, 332, 333, 429/231.95, 188, 189; 252/62.2
See application file for complete search history.

(56) References Cited

FOREIGN PATENT DOCUMENTS

| JP | 7-176323 | | 7/1995 |
|---|---|---|---|
| JP | 7-320779 | | 12/1995 |
| JP | 11-111306 | | 4/1999 |
| JP | 2007-018945 | * | 1/2007 |
| JP | 2008-218487 | * | 9/2008 |

* cited by examiner

*Primary Examiner*—Laura S Weiner
(74) *Attorney, Agent, or Firm*—Stein McEwen, LLP (57) ABSTRACT

An electrolyte for a lithium ion secondary battery includes a non-aqueous organic solvent; lithium salt; and difluoro oxalato borate and fluoro ethylene carbonate (FEC). The capacity retention property and durability of a lithium ion secondary battery including the electrolyte is excellent even when the battery is left at a high temperature.

19 Claims, 3 Drawing Sheets

ELECTROLYTE FOR LITHIUM ION SECONDARY BATTERY AND LITHIUM ION SECONDARY BATTERY COMPRISING THE SAME

CROSS-REFERENCE TO RELATED APPLICATION

This application claims the benefit of Korean Application No. 2008-47027, filed May 21, 2008 in the Korean Intellectual Property Office, the disclosure of which is incorporated herein by reference

BACKGROUND OF THE INVENTION

1. Field of the Invention

Aspects of the present invention relate to an electrolyte for a lithium ion secondary battery and a lithium ion secondary battery comprising the same. More particularly, aspects of the present invention relate to an electrolyte that can improve capacity retention property, thermal stability and durability of a lithium ion secondary battery, even when the battery is left at a high temperature, by containing difluoro oxalato borate (DFOB) and fluoro ethylene carbonate (FEC) as additives, and a lithium ion secondary battery comprising the same.

2. Description of the Related Art

A battery is a device that converts the chemical energy of chemical materials inside the battery into electrical energy through an electrochemical oxidation/reduction reaction. Recently, portable devices such as camcorders, cellular phones, notebook computers, PCs and PDAs have been actively developed with rapid progress of the electronic, telecommunication and computer industries. Accordingly, there has been an increased demand for a slim secondary battery of high performance, durability and reliability that can be used in the above portable devices.

A lithium ion battery has been widely used as a secondary battery because it has a high discharge voltage near 4V, an excellent energy density per weight and a low self-discharge rate.

In the lithium secondary battery, the ion conductivity of the electrolyte greatly affects the charge/discharge performance of the battery. Thus, it is desirable that an electrolyte have a high ion conductivity. Accordingly, in the battery industry, many experiments have been performed to improve electrochemical characteristics such as the ion conductivity of the battery by mixing a solvent of a high dielectric constant and a solvent of a low viscosity. In addition, research has been actively conducted to improve the thermal stability of the battery by mixing a solvent of a high boiling point (Japanese Patent publication No. 1999-111306).

During initial charging of the lithium battery, lithium ions released from a positive electrode move to a carbon electrode used as a negative electrode and form a film on the surface of the negative electrode. Such a film is called as a SEI (solid electrolyte interface) film. The SEI film greatly affects on discharge capacity during subsequent cycles. Physical and chemical properties of the SEI film are changed according to salt used in the electrolyte, the concentration of the salt, components of solvent mixture, composition of the solvent mixture and the kind of additive used. When an uneven SEI film is formed, because an additive is not used or because undesirable additive is used, electrons in active materials are released and cause decomposition of the electrolyte. Accordingly, the irreversible capacity of the active material is increased and the capacity and lifetime of the battery is reduced. With respect to the SEI film, there has been much research directed to improving the physical and chemical properties of the film by changing the SEI film formation reaction by adding an additive to the electrolyte. For example, there have been disclosed techniques of adding $CO_2$ to the electrolyte (Japanese Patent publication No. 1995-176323A) or preventing decomposition of the electrolyte by adding a sulfide group compound to the electrolyte (Japanese Patent publication No. 1995-320779A).

Accordingly, an electrolyte having high ion conductivity, high dielectric constant and low viscosity is desirable in the lithium secondary battery. In addition, a solvent capable of reducing decomposition and vaporization of the electrolyte after discharge is desirable to improve discharge characteristics of the battery at a high temperature. In addition, an additive is desirable to form an even SEI film that transfers lithium ions well but does not transfer other material.

SUMMARY OF THE INVENTION

Accordingly, aspects of the present invention provide an electrolyte for a lithium ion secondary battery that can improve capacity retention property, thermal stability and durability even when the battery is left at a high temperature.

Additional advantages, aspects and features of the invention will be set forth in part in the description which follows and in part will become apparent to those having ordinary skill in the art upon examination of the following or may be learned from practice of the invention.

According to an embodiment of the present invention, there is provided an electrolyte for a lithium ion secondary battery that includes a non-aqueous organic solvent; lithium salt; and difluoro oxalato borate (DFOB) represented by a chemical formula 1 below and fluoro ethylene carbonate (FEC) as additives, where the amount of difluoro oxalato borate is 0.1 to 5 parts by weight based on 100 parts by weight of the total electrolyte and the amount of the fluoro ethylene carbonate is 0.1 to 10 parts by weight based on 100 parts by weight of the total electrolyte:

[Chemical formula 1]

According to an aspect of the present invention, the amount of the difluoro oxalato borate represented by the chemical formula 1 may be 0.5 to 5 parts by weight based on 100 parts by weight of the total electrolyte and the amount of the fluoro ethylene carbonate may be 2 to 10 parts by weight based on 100 parts by weight of the total electrolyte.

According to an aspect of the present invention, the non-aqueous organic solvent may be at least one selected from the group consisting of a carbonate, an ester, an ether and a ketone.

According to an aspect of the present invention, the carbonate may be at least one selected from the group consisting of dimethyl carbonate, diethyl carbonate, dipropyl carbonate, methylpropyl carbonate, ethylpropyl carbonate, ethylmethyl carbonate, ethylene carbonate, propylene carbonate, butylene carbonate and pentylene carbonate.

According to an aspect of the present invention, the ester may be at least one selected from the group consisting of methyl acetate, ethyl acetate, propyl acetate, dimethyl acetate, methyl propionate, ethyl propionate, γ-butyrolactone, decanolide, valerolactone, mevalonolactone and caprolactone.

According to an aspect of the present invention, the ether may be at least one selected from the group consisting of dibutyl ether, tetraglyme, diglyme, dimethoxy ethane, 2-methyltetrahydrofuran and tetrahydrofuran.

According to an aspect of the present invention, the ketone may be at least one selected from the group consisting of polymethylvinyl ketone and cyclohexanone.

According to an aspect of the present invention, the lithium salt may be at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (where p and q are natural numbers), LiCl and LiI.

According to another embodiment of the present invention, there is provided a lithium ion secondary battery, which comprises: a cathode including a cathode active material that can reversibly intercalate and deintercalate lithium; an anode including an anode active material that can reversibly intercalate and deintercalate lithium; and the above electrolyte according to aspects of the present invention.

According to another embodiment of the present invention, there is provided a method of improving a capacity retention property, thermal stability and durability of a lithium ion secondary battery, the method comprising injecting an electrolyte comprising a non-aqueous organic solvent; a lithium salt; difluoro oxalato borate and fluoro ethylene carbonate (FEC), wherein the amount of the difluoro oxalato borate is 0.1 to 5 parts by weight based on 100 parts by weight of the total electrolyte and the amount of the fluoro ethylene carbonate is 0.1 to 10 parts by weight based on 100 parts by weight of the total electrolyte, into a battery can including an electrode assembly comprising a cathode including a cathode active material that can reversibly intercalate and deintercalate lithium; an anode including an anode active material that can reversibly intercalate and deintercalate lithium to form a lithium ion secondary battery; and charging the lithium ion secondary battery or exposing the lithium ion secondary battery to a temperature of 60° C. or greater.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrolyte according to aspects of the present invention includes difluoro oxalato borate (DFOB), represented by a chemical formula 1 below, and fluoro ethylene carbonate (FEC) as additives:

[Chemical formula 1]

The difluoro oxalato borate is added to the electrolyte with fluoro ethylene carbonate. The difluoro oxalato borate prevents loss of lithium caused by reaction between lithium and electrolyte by forming a film having high thermal stability on an anode at the time of initial charging or forms the film on an electrode active material when the battery is exposed to a high temperature. In addition, the difluoro oxalato borate has a high oxidation-decomposition voltage and thus can prevent degradation of cycle characteristics of the battery and can improve thermal stability by preventing decomposition of the electrolyte. According to one embodiment, the amount of the difluoro oxalato borate may be 0.1 to 5, or more specifically, 0.5 to 5 parts by weight to 100 parts by weight of the total electrolyte, and the amount of the fluoro ethylene carbonate may be 0.1 to 10, or more specifically, 2 to 10 parts by weight to 100 parts by weight of the total electrolyte. When the amount of the additive is less than the above range, improvement of the thermal stability and durability may be negligible. On the other hand, when the amount of the additive is more than the above range, the viscosity of the electrolyte is increased, which may reduce the movement of lithium ions and adversely affect the thermal stability.

The electrolyte also includes a non-aqueous organic solvent and lithium salts. The non-aqueous organic solvent functions as a medium that transfers lithium ions participated in the electrochemical reaction of the battery. The non-aqueous organic solvent may be at least one selected from the group consisting of a carbonate, an ester, an ether and a ketone, or a mixture thereof.

The carbonate group solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC) or butylene carbonate (BC).

The ester group solvent may be n-methyl acetate, n-ethyl acetate, n-propyl acetate, dimethyl acetate, methyl propionate, ethyl propionate, γ-butyrolactone, decanolide, valerolactone, mevalonolactone or caprolactone.

The ether may be dibutyl ether, tetraglyme, diglyme, dimethoxy ethane, 2-methyltetrahydrofuran or tetrahydrofuran.

The ketone may be cyclohexanone or polymethylvinyl ketone.

The non-aqueous organic solvent may be used alone, or a mixture of solvents may be used. When a mixture of organic solvents is used, the mixing ratio may be properly controlled according to the desired battery performance. An organic solvent having a high dielectric constant and a low viscosity may be used to transfer ions smoothly by improving the dissociation of ions. Generally, it is desirable to use a mixture of at least two solvents including a solvent having high dielectric constant and viscosity and a solvent having low dielectric constant and viscosity. It is desirable to use a mixture of a cyclic type carbonate and a chain type carbonate as the carbonate group solvent. It is further desirable that the mixing ratio of the cyclic type carbonate to the chain type carbonate be 1:1 to 1:9 in volume ratio to improve the performance of the electrolyte.

The non-aqueous organic solvent may further include an aromatic hydrocarbon group organic solvent in addition to the carbonate group organic solvent. An aromatic hydrocarbon compound having the following chemical formula 2 may be used as the aromatic hydrocarbon group organic solvent.

[Chemical formula 2]

where R is halogen or an alkyl group having 1 to 10 carbons and q is an integer of 0 to 6.

The aromatic hydrocarbon group organic solvent may be any one of benzene, fluorobenzene, bromobenzene, chlorobenzene, toluene, xylene, or mesitylene or mixture thereof. When the volume ratio of the carbonate solvent to the aromatic hydrocarbon group organic solvent is 1:1 to 30:1 in the electrolyte containing the aromatic hydrocarbon group organic solvent, generally desirable properties of the electrolyte such as stability, safety and ion conductivity are improved, in comparison to compositions having other volume ratios.

The lithium salt functions as a source of lithium ions and enables basic operations of the lithium ion secondary battery and promotes movement of lithium ions between the cathode and anode. The lithium salt may be any one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (p and q are natural numbers), LiCl and LiI or mixture thereof. It is desirable to use a lithium salt that has a low lattice energy, high dissociation degree, excellent ion conductivity, thermal stability and oxidation resistance. In addition, it is desirable that the concentration of the lithium salt be in the range of 0.1 to 2.0M. When the concentration of the lithium salt is less than 0.1 M, the conductivity of the electrolyte is decreased and thus, the performance thereof may be degraded. On the other hand, when the concentration of the lithium salt is more than 2.0M, the viscosity of the electrolyte is increased and thus, the movement of the lithium ions may reduced.

The lithium secondary battery comprising the electrolyte includes a cathode, an anode and a separator. The cathode includes a cathode active material that can reversibly intercalate and deintercalate lithium ions. As a non-limiting example, the cathode active material may be a composite metal oxide of lithium and at least one selected from cobalt, manganese and nickel. The solid solubility of metals may be variously used in the composite metal oxide. In addition to these metals, one or more metals selected from the group consisting of Mg, Al, Co, K, Na, Ca, Si, Ti, Sn, V, Ge, Ga, B, As, Zr, Mn, Cr, Fe, Sr, V and rare earth elements may be further included.

The anode includes an anode active material that can reversibly intercalate and deintercalate lithium ions. Crystalline or amorphous carbon, carbonic anode active material (thermally decomposed carbon, coke, graphite) such as a carbon composite, combusted organic polymer, carbon fiber, tin oxide, lithium metal or an alloy of lithium and another element may be used as the anode active material. For example, the amorphous carbon may be hard carbon, coke, mesocarbon microbeads (MCMB) fired below 1500° C., mesophase pitch-based carbon fiber (MPCF), etc. The crystalline carbon may be a graphite material, more particularly, natural graphite, graphitized cokes, graphitized MCMB, or graphitized MPCF, etc.

The anode and cathode may be made by preparing an electrode slurry composition by dispersing the electrode active material, a binder, a conductive material and a thickener, if desired, in a solvent and coating the slurry composition onto an electrode collector. As non-limiting examples, aluminum or an aluminum alloy may be used as a cathode collector and copper or copper alloy may be used as an anode collector. The anode and cathode collectors may be formed as a foil or mesh.

The lithium secondary battery includes a separator that prevents a short between the cathode and anode. As non-limiting examples, a polymer membrane such as a polyolefin, polypropylene or polyethylene membrane, a multi-membrane thereof, a micro-porous film, or a woven or non-woven fabric may be used as the separator.

A unit battery having a structure of cathode/separator/anode, a bi-cell having a structure of cathode/separator/anode/separator/cathode, or a battery stack including a plurality of unit batteries may be formed using above-described lithium secondary battery including the electrolyte, cathode, anode and separator.

Figure 1:
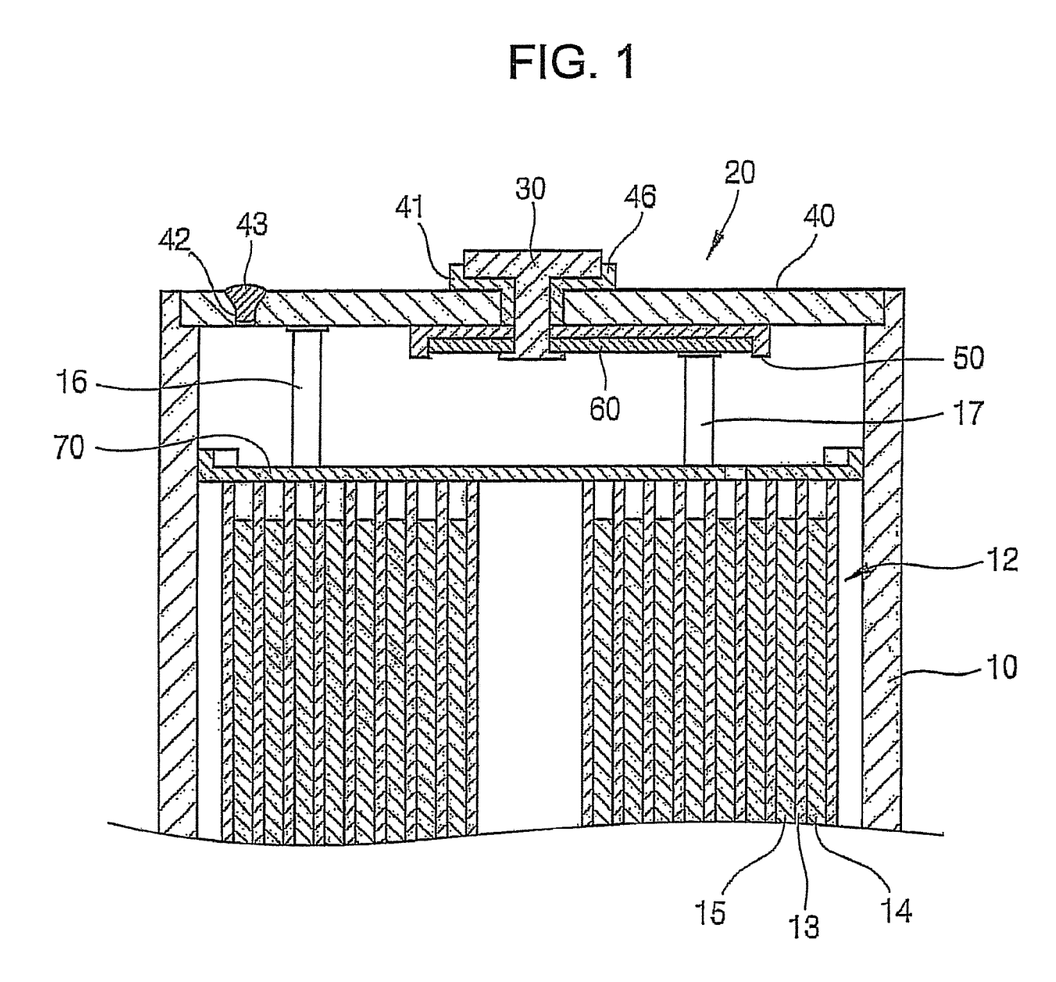
FIG. 1 is a view illustrating a rectangular type lithium ion secondary battery according to one exemplary embodiment of the present invention.

A typical lithium secondary battery having the above construction is shown in FIG. 1.

Referring to FIG. 1, the lithium secondary battery is formed of an electrode assembly 12 including a cathode 13, an anode 15 and a separator 14, a can 10 receiving the electrode assembly and electrolyte, and a cap assembly 20 sealing an upper part of the can 10. The cap assembly 20 includes a cap plate 40, an insulation plate 50, a terminal plate 60 and an electrode terminal 30. The cap assembly 20 is combined with an insulation case 70 to seal the can 10.

The electrode terminal 30 is inserted into a terminal hole 41 formed at the middle of the cap plate 40. When the electrode terminal 30 is inserted into the terminal hole 41, a tubular gasket 46 combined with an outer surface of the electrode terminal 30 is inserted into the terminal hole 41 to insulate the electrode terminal 30 from the cap plate 40. After the cap assembly 20 is fastened onto the upper part of the can 10, the electrolyte is injected through an electrolyte injection hole 42 and then the electrolyte injection hole 42 is sealed by a stopper 43. The electrode terminal 30 is connected to an anode tab 17 of the anode or a cathode tab 16 of the cathode to function as an anode terminal or a cathode terminal.

The lithium secondary battery may be formed in various types such as cylindrical and pouch types in addition to the rectangular type.

Embodiments of the present invention and comparison examples will be explained below, but the present invention is not limited thereto.

Embodiment 1

A cathode active material slurry was prepared by dispersing $LiCoO_2$ as a cathode active material, polyvinylidene fluoride (PVdF) as a binder, and carbon as a conductive material in an N-methyl-2-pyrrolidone (NMP) solvent at a weight ratio of 92:4:4. Then, a cathode was formed by coating the cathode active material slurry onto an aluminum foil having a thickness of 15 μm, and then drying and rolling the coated foil. The anode active material slurry was prepared by mixing artificial graphite as an anode active material, styrene-butadiene rubber as a binder, and carboxymethylcelluose as a thickener at a weight ratio of 96:2:2, then dispersing the mixture in water. Then, an anode was formed by coating the slurry onto a copper foil having a thickness of 10 μm, and drying and rolling the coated foil.

Next, after a polyethylene (PE) separator having a thickness of 10 μm was interposed between the above electrodes to form an electrode assembly, the electrode assembly was wound and pressurized. Then, the electrode assembly was inserted into a rectangular can having a size of 55 mm by 34 mm by 50 mm. Then, the electrolyte described below was injected into the can, thereby completing a lithium secondary battery.

The electrolyte was prepared by adding $LiPF_6$ in a mixture solvent of ethylene carbonate, ethylmethyl carbonate and diethyl carbonate (the volume ratio was 1:1:1) and adding difluoro oxalato borate and fluoro ethylene carbonate, where the concentration of the $LiPF_6$ was 1.0M. The amount of difluoro oxalato borate was 0.5 parts by weight and the amount of the fluoro ethylene carbonate was 3 parts by weight based on 100 parts by weight of the total electrolyte.

Embodiment 2

This embodiment was carried out in the same manner as Embodiment 1, except that the amount of difluoro oxalato borate was 1 part by weight and the amount of fluoro ethylene carbonate was 3 parts by weight.

Embodiment 3

This embodiment was carried out in the same manner as Embodiment 1, except that the amount of difluoro oxalato borate was 1 part by weight and the amount of fluoro ethylene carbonate was 5 parts by weight.

Embodiment 4

This embodiment was carried out in the same manner as Embodiment 1, except that the amount of difluoro oxalato borate was 3 parts by weight and the amount of fluoro ethylene carbonate was 5 parts by weight.

Embodiment 5

This embodiment was carried out in the same manner as Embodiment 1, except that the amount of difluoro oxalato borate was 0.5 parts by weight and the amount of fluoro ethylene carbonate was 10 parts by weight.

Comparison Example 1

This comparison example was carried out in the same manneras Embodiment 1, except that amount of difluoro oxalato borate was 3 parts by weight, and fluoro ethylene carbonate was not added.

Comparison Example 2

This comparison example was carried out in the same manner as Embodiment 1, except that difluoro oxalato borate was not added, and the amount of fluoro ethylene carbonate was 3 parts by weight.

Comparison Example 3

This comparison example was carried out in the same manner as Embodiment 1, except that the amount of difluoro oxalato borate was 0.5 parts by weight and the amount of fluoro ethylene carbonate was 15 parts by weight were added.

The capacity and capacity retention ratios according to the repetition of charge/discharge cycles were measured for the batteries manufactured in the embodiments and comparison examples after the batteries had been left for 30 days at 60° C. Thus, when the difluoro oxalato borate and fluoro ethylene carbonate were simultaneously used as additives, a positive effect on the lifetime and thermal stability of the battery was confirmed.

Experimental Example 1

Figure 2:
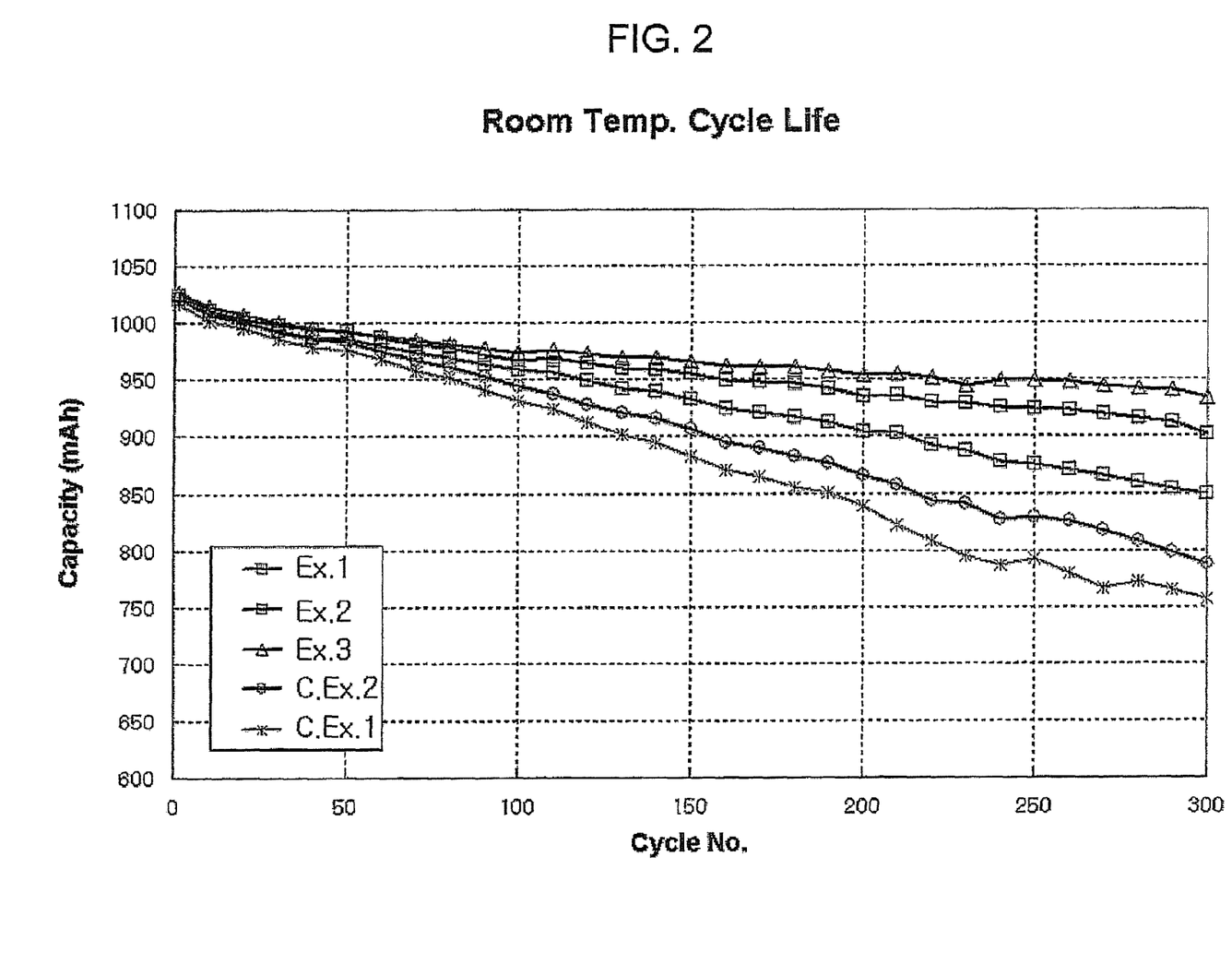
FIG. 2 is a graph illustrating capacity relative to the number of charge/discharge cycle according to Embodiments 1 to 5 and Comparison Examples 1 to 3.
Figure 3:
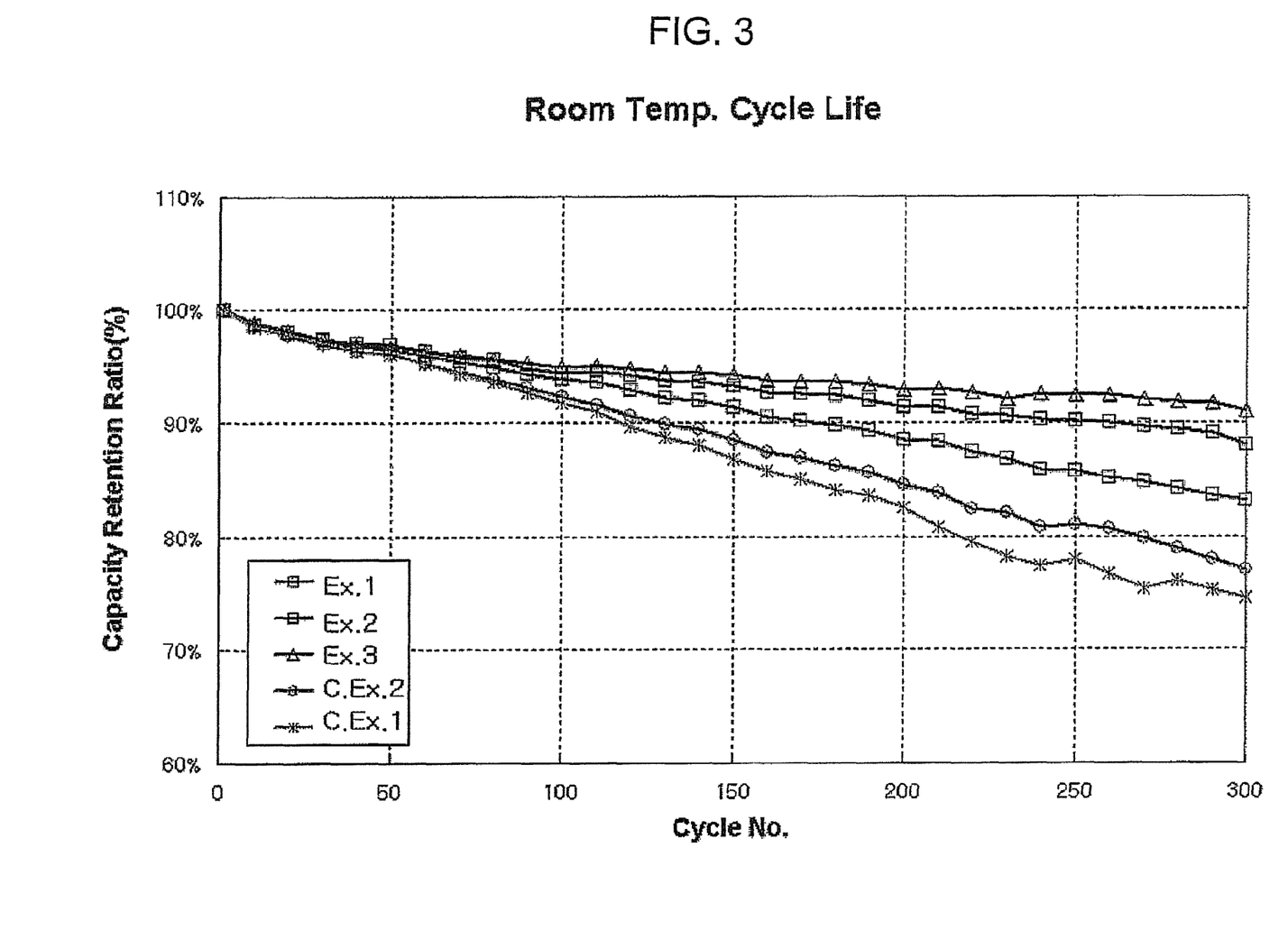
FIG. 3 is a graph illustrating capacity retention ratio relative to the number of charge/discharge cycle according to Embodiments 1 to 5 and Comparison Examples 1 to 3.

Lifetime Test—Capacity and Capacity Retention Ratio According to Repetition of Charge/Discharge The batteries manufactured in the embodiments 1 to 5 and the comparison examples 1 to 3 were charged with a constant current 1C until their voltages reached to 4.2V, after that they were charged with a constant voltage of 4.2V at a room temperature until total charging time reached to 3 hrs, and then discharged with a constant current of 1C until their voltages reached to 3.0V. Where C is a unit of 'c-rate' and 'c-rate' is a charge or discharge current rate of battery expressed in amperes. The charge/discharge was performed for 100, 200 and 300 cycles respectively. Then, capacities corresponding to the cycles were measured, and the results are shown in FIG. 2. The capacity retention ratios (%) corresponding to the cycles were calculated as below and the results are shown in FIG. 3 and Table 1.

Capacity retention ratio (%) of the corresponding cycle=(discharging capacity of the corresponding cycle/discharging capacity of the first cycle)*100 (%)

Experimental Example 2

Thermal Stability Test—Capacity Retention Property after the Battery was Left for 30 Days at 60° C.

The batteries manufactured in Embodiments 1 to 5 and Comparison Examples 1 to 3 were charged with a constant current and constant voltage of 0.5C/4.2V for 3 hours and left for 30 days at 60° C. Then, after the batteries were discharged with 0.5C/3.0V, the capacity retention ratio was measured. The results are shown in Table 1.

Capacity retention ratio after the battery was left at a high temperature=((discharging capacity after the battery was left−initial capacity)/initial capacity) *100 (%).

TABLE 1

|  | DFOB (parts by weight) | FEC (parts by weight) | Capacity retention ratio (%) after 300 charge/discharge cycles | Capacity retention ratio (%) after the battery was left for 30 days at 60° C. |
| --- | --- | --- | --- | --- |
| Embodiment 1 | 0.5 | 3 | 83 | 81 |
| Embodiment 2 | 1 | 3 | 88 | 83 |
| Embodiment 3 | 1 | 5 | 91 | 80 |
| Embodiment 4 | 3 | 5 | 86 | 75 |
| Embodiment 5 | 0.5 | 10 | 86 | 75 |
| Comparison example 1 | 3 | 0 | 74 | 53 |
| Comparison example 2 | 0 | 3 | 77 | 64 |
| Comparison example 3 | 0.5 | 15 | 86 | 50 |

As shown in Table 1, when difluoro oxalato borate (DFOB) of 0.1 to 5 parts by weight and fluoro ethylene carbonate (FEC) of 0.1 to 10 parts by weight were added, the capacity retention ratios after charge/discharge cycles, that is, the lifetime of the batteries was improved and the capacity retention property was improved after the battery was left at the high temperature. When only one of the difluoro oxalato borate or fluoro ethylene carbonate was added, the capacity retention property was inferior.

In addition, referring to FIGS. 2 and 3, in the cases of the Embodiments 1 to 3 in which the DFOB and FEC were added, the discharge capacity and capacity retention ratio after charge/discharge of 300 cycles were excellent compared than the Comparison Examples.

As described above, the lithium secondary battery comprising the electrolyte according to aspects of the present invention produces the effect that the capacity retention property of the battery is improved even when the battery is left at a high temperature. Thus, thermal stability and durability of the battery are prominently improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium ion secondary battery comprising:
    a non-aqueous organic solvent;
    a lithium salt; and
    difluoro oxalato borate (DFOB) represented by a chemical formula 1 below and fluoro ethylene carbonate (FEC) as additives,
    where the amount of the difluoro oxalato borate is 0.1 to 5 parts by weight based on 100 parts by weight of the total electrolyte and the amount of the fluoro ethylene carbonate is 0.1 to 10 parts by weight based on 100 parts by weight of the total electrolyte:

[Chemical formula 1]

2. The electrolyte of claim 1, wherein the amount of the difluoro oxalato borate represented by the chemical formula 1 is 0.5 to 5 parts by weight based on 100 parts by weight of the total electrolyte.

3. The electrolyte of claim 1, wherein the amount of the fluoro ethylene carbonate is 2 to 10 parts by weight based on 100 parts by weight of the total electrolyte.

4. The electrolyte of claim 1, wherein the non-aqueous organic solvent is at least one selected from the group consisting of a carbonate, an ester, an ether and a ketone.

5. The electrolyte of claim 4, wherein the carbonate is at least one selected from the group consisting of dimethyl carbonate, diethyl carbonate, dipropyl carbonate, methylpropyl carbonate, ethylpropyl carbonate, ethylmethyl carbonate, ethylene carbonate, propylene carbonate, butylene carbonate and pentylene carbonate.

6. The electrolyte of claim 4, wherein the ester is at least one selected from the group consisting of n-methyl acetate, n-ethyl acetate, n-propyl acetate, dimethyl acetate, methyl propionate, ethyl propionate, γ-butyrolactone, decanolide, valerolactone, mevalonolactone and caprolactone.

7. The electrolyte of claim 4, wherein the ether is at least one selected from the group consisting of dibutyl ether, tetraglyme, diglyme, dimethoxy ethane, 2-methyltetrahydrofuran and tetrahydrofuran.

8. The electrolyte of claim 4, wherein the ketone is at least one selected from the group consisting of cyclohexanone and polymethylvinyl ketone.

9. The electrolyte of claim 1, wherein the lithium salt is at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (where p and q are natural numbers), LiCl and LiI.

10. A lithium ion secondary battery, comprising:
    a cathode including a cathode active material that can reversibly intercalate and deintercalate lithium;
    an anode including an anode active material that can reversibly intercalate and deintercalate lithium; and
    the electrolyte of claim 1.

11. A lithium ion secondary battery, comprising:
    a cathode including a cathode active material that can reversibly intercalate and deintercalate lithium;
    an anode including an anode active material that can reversibly intercalate and deintercalate lithium; and
    the electrolyte of claim 2.

12. A lithium ion secondary battery, comprising:
    a cathode including a cathode active material that can reversibly intercalate and deintercalate lithium;

an anode including an anode active material that can reversibly intercalate and deintercalate lithium; and the electrolyte of claim 3.

13. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 4.

14. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 5.

15. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 6.

16. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 7.

17. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 8.

18. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 9.

19. A method of improving a capacity retention property, thermal stability and durability of a lithium ion secondary battery, the method comprising:

injecting an electrolyte comprising a non-aqueous organic solvent; a lithium salt; difluoro oxalato borate and fluoro ethylene carbonate (FEC), wherein the amount of the difluoro oxalato borate is 0.1 to 5 parts by weight based on 100 parts by weight of the total electrolyte and the amount of the fluoro ethylene carbonate is 0.1 to 10 parts by weight based on 100 parts by weight of the total electrolyte, into a battery can including an electrode assembly comprising a cathode including a cathode active material that can reversibly intercalate and deintercalate lithium; an anode including an anode active material that can reversibly intercalate and deintercalate lithium to form a lithium ion secondary battery; and charging the lithium ion secondary battery or exposing the lithium ion secondary battery to a temperature of 60° C. or greater.

* * * * *

UNITED STATES PATENT AND TRADEMARK OFFICE
CERTIFICATE OF CORRECTION

PATENT NO. : 7,592,102 B1 Page 1 of 1
APPLICATION NO. : 12/256781
DATED : September 22, 2009
INVENTOR(S) : Jinsung Kim et al.

It is certified that error appears in the above-identified patent and that said Letters Patent is hereby corrected as shown below:

Title Page, item (75) Inventors, change "Jinburn Kim" to --Jinbum Kim--.

Signed and Sealed this

Eighth Day of December, 2009

David J. Kappos
*Director of the United States Patent and Trademark Office*